Figure 1:
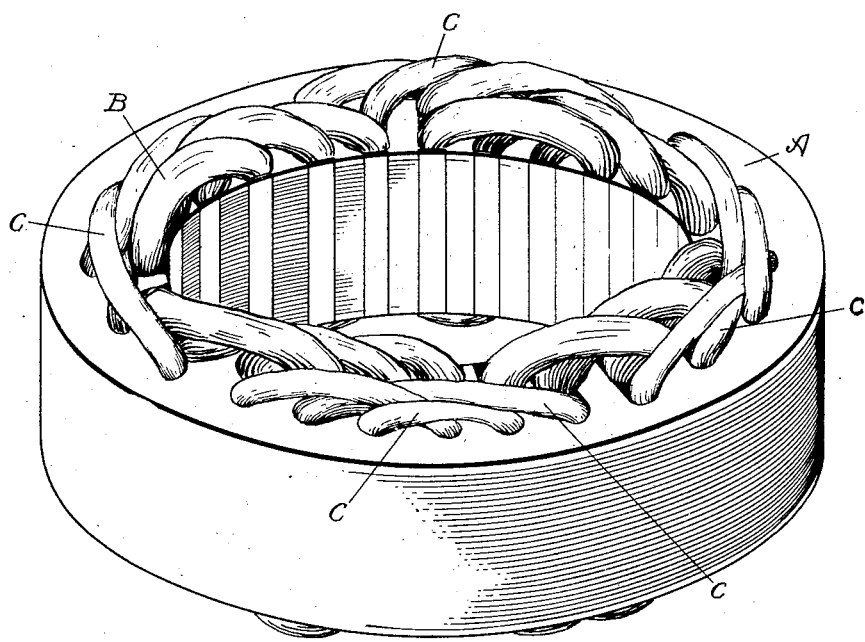

No. 744,144. PATENTED NOV. 17, 1903.
J. B. WIARD.
METHOD OF WINDING DYNAMO ELECTRIC MACHINES.
APPLICATION FILED MAR. 21, 1903.
NO MODEL. 3 SHEETS—SHEET 1.

Witnesses.

Inventor.
John B. Wiard.
by Albert H. Davis
Atty.

No. 744,144. PATENTED NOV. 17, 1903.
J. B. WIARD.
METHOD OF WINDING DYNAMO ELECTRIC MACHINES.
APPLICATION FILED MAR. 21, 1903.
NO MODEL. 3 SHEETS—SHEET 2.
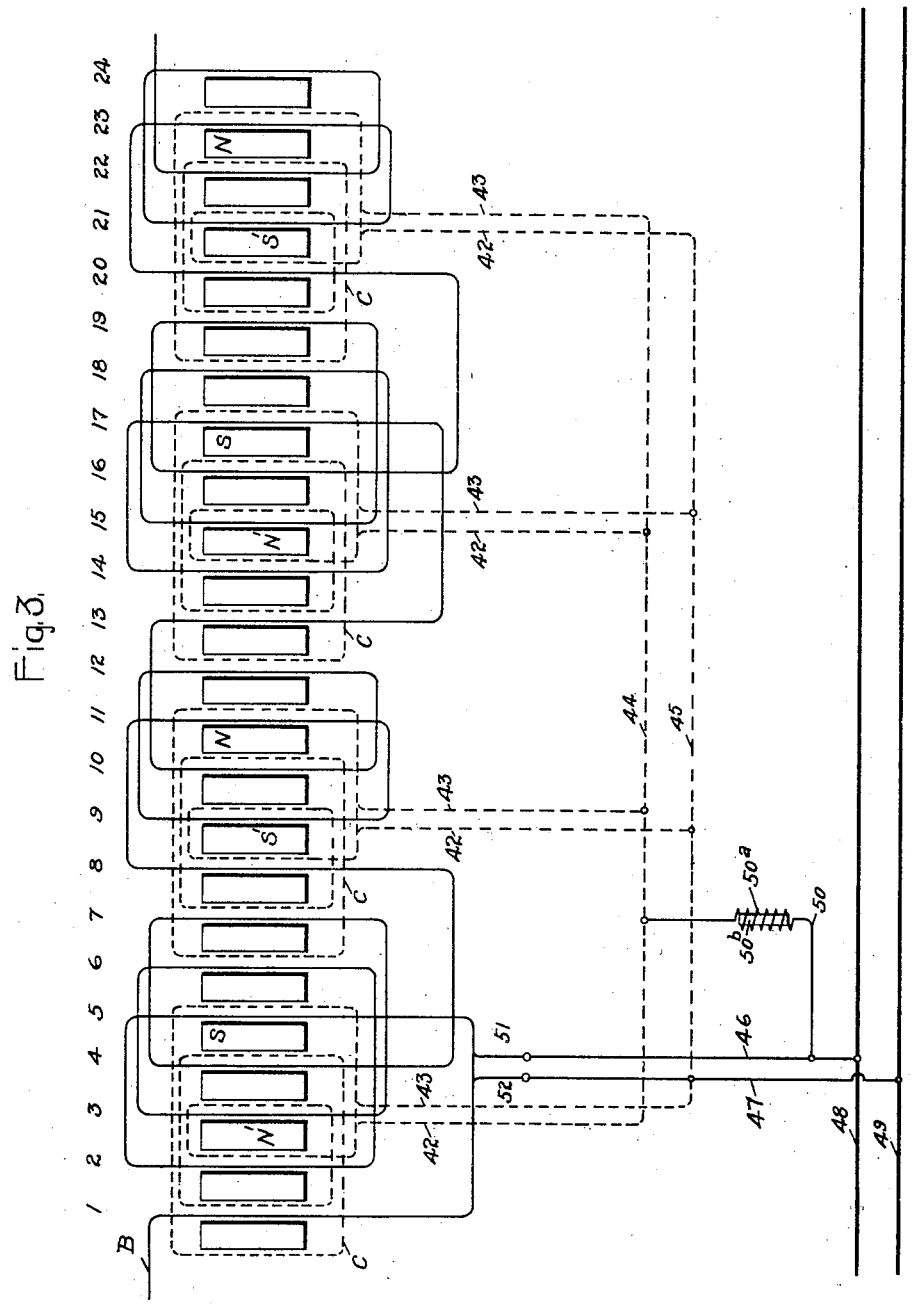

No. 744,144. PATENTED NOV. 17, 1903.
J. B. WIARD.
METHOD OF WINDING DYNAMO ELECTRIC MACHINES.
APPLICATION FILED MAR. 21, 1903.
NO MODEL. 3 SHEETS—SHEET 3.
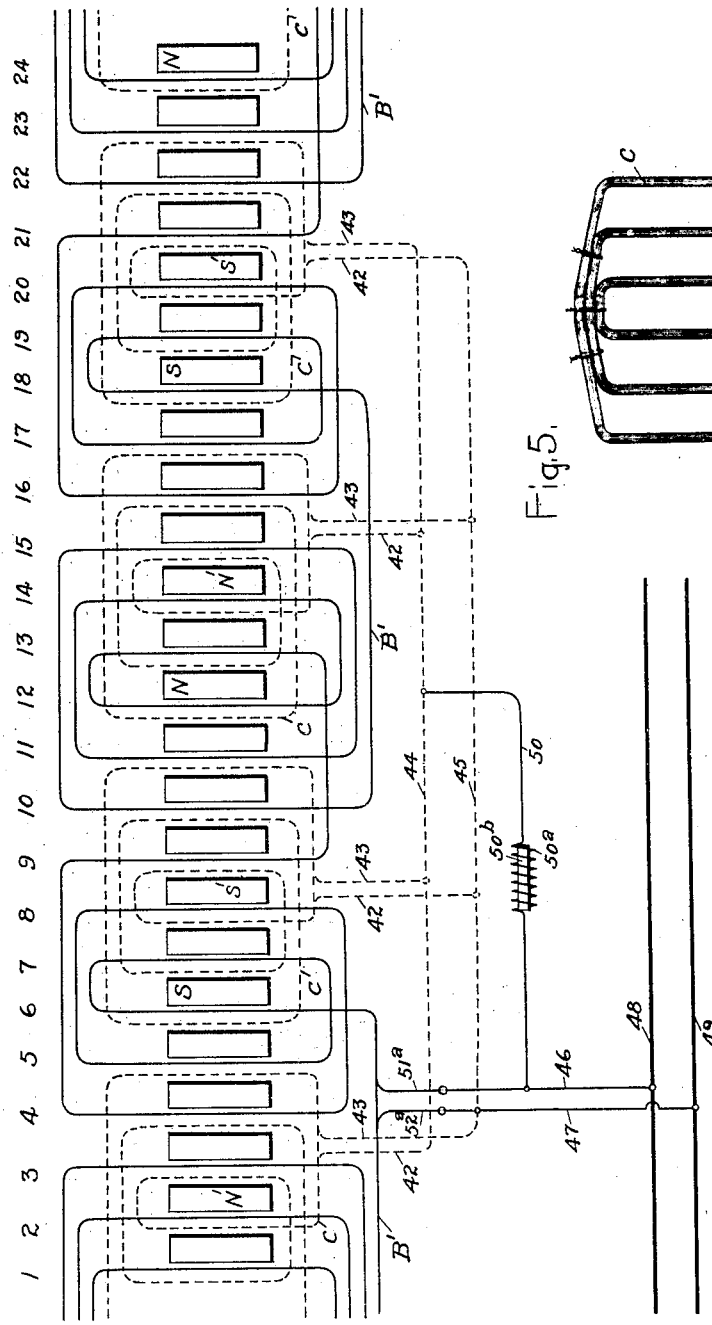
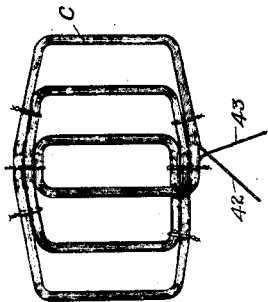
Witnesses:
Inventor:
John B. Wiard.
by Albert G. Davis
Att'y No. 744,144. Patented November 17, 1903.

UNITED STATES PATENT OFFICE.

JOHN B. WIARD, OF LYNN, MASSACHUSETTS, ASSIGNOR TO GENERAL ELECTRIC COMPANY, A CORPORATION OF NEW YORK.

METHOD OF WINDING DYNAMO-ELECTRIC MACHINES.

SPECIFICATION forming part of Letters Patent No. 744,144, dated November 17, 1903.

Application filed March 21, 1903. Serial No. 148,919. (No model.)

*To all whom it may concern:*

Be it known that I, JOHN B. WIARD, a citizen of the United States, residing at Lynn, county of Essex, State of Massachusetts, have invented certain new and useful Improvements in Methods of Winding Dynamo-Electric Machines, of which the following is a specification.

The method constituting the subject-matter of the present application is applicable to dynamo-electric machines provided with distributed windings—that is, with windings in which the polar area is covered by a group of coils consisting of a number of different coils angularly displaced from one another on the core—and is particularly valuable in the winding of small-sized dynamo-electric machines.

In making up distributed windings for large machines it is now the universal custom to wind the coils separately on forms, and after they have been properly insulated to assemble them on the magnetic structure or core of the machine and connect their terminals together in the desired order. For small machines, however, the winding and taping of a number of different coils, their subsequent assembly on the slotted core, and the making of the necessary electrical connections between the different coils is a matter involving considerable labor and expense, and especially is this the case if instead of a lapped winding (in which counterpart coils may be used) it is desired to use a winding in which the turns for each pole are made up of a number of concentric coils, since this involves the winding of several different sizes of coils for any one machine.

According to the method constituting the subject of the present application, instead of winding a number of distinct coils for each group one long coil is wound and is then woven either into the proper slots of the core itself or upon a suitable form in such a way as to give the desired series arrangement of the conductors. When the winding is made on a form, it constitutes a separate and distinct article of manufacture, which may be readily placed in position upon any core of the size and type for which it was designed. The winding may be either a lap or a concentric winding according to the manner in which the coil is woven. An important advantage resulting from the employment of this method over existing methods is the great reduction in the number of necessary terminal connections.

In the accompanying drawings I have shown the field-windings of a four-pole single-phase induction-motor wound according to my invention. These windings comprise a main winding and four auxiliary windings, each formed by weaving into the slots of the core a long coil composed of a number of turns of fine wire. The main winding consists of a single long coil disposed upon the core, so as to form four polar windings, while the auxiliary windings are made up of four shorter coils, each forming a single polar-winding. The auxiliary windings, together with means for dephasing the current passing through them, hereinafter referred to, constitute the means for making the machine self-starting.

Figure 2:
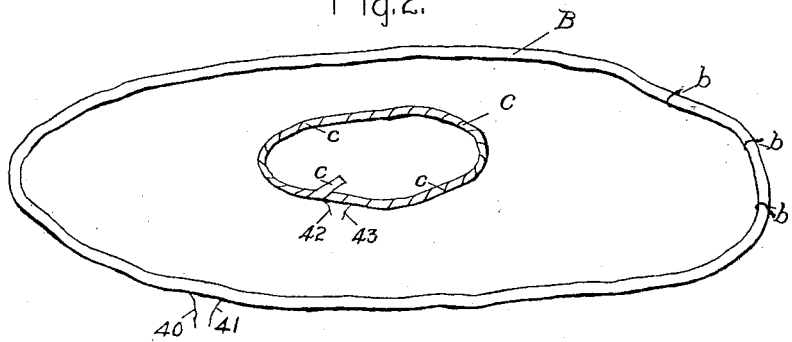

Figure 1 of the drawings is a perspective view of the field-core above referred to with all the windings in place, the main winding being lap-wound and the auxiliary windings concentrically wound. Fig. 2 is a view illustrating the relative sizes of the coils used in the main and auxiliary windings. Fig. 3 is a diagram illustrating the main winding lap-wound and the auxiliary windings concentrically wound upon the developed surface of the magnetic core. Fig. 4 is a similar diagram, in which both the main and auxiliary windings are concentrically wound; and Fig. 5 is a view of one of the auxiliary coils wound as a separate article of manufacture.

In said drawings, in which like characters refer to like parts throughout the several views, A designates the magnetic core, which is constructed in the usual manner by assembling and binding together a number of sheet-metal punchings in the form of a ring, with slots and teeth on its inner surface for the reception of the windings. In the slots or notches of the core A the coils B and C are woven in such a manner as to provide the necessary polar windings. Each of these coils is made by winding in any suitable manner a large number of turns of fine wire and suitably binding them together, as by cords $b\ b$ or tape $c$, as shown in Fig. 2, leaving the terminals of the wire exposed. These coils should be made of such a length that when placed on the form or in the proper slots of the core to produce the desired windings there will be no surplus or unused portions. The necessary length for any given machine can then be determined by experiment, and it may be varied according to the extent of the core the winding is designed to embrace. In the winding which I have illustrated the coil B is made of sufficient length to traverse all the slots of the core, while each of the coils C traverses only a fourth of the total number. The coils having been made in the manner above described are now woven into the slots of the magnetic core.

In Figs. 3 and 4 I have shown the magnetic core developed upon a plane surface and have indicated the slots by numerals 1 to 24, located in a line above the windings. In each of these figures the disposition of the auxiliary coils upon the core is identical, and each forms a concentric winding. Considering the left-hand coil in each of the diagrams, it will be seen that the coil is first passed into the slot 2 and while firmly held therein is brought over to and down through slot 3, then up through 1, down through 4, up through 24, and down through 5. This is the complete winding for this coil, and according to previous calculation the length is made just sufficient to take up all the slack when the coil is pressed home into the slot 5. In a similar manner each of the other coils C is put in place. Thus each of these long coils C is the practical equivalent of three short coils connected in series, as illustrated in the left-hand coil C in the diagram, in which the first short coil passes up through slot 2 and down through 3, the second up through 1 and down through 4, and the third up through 24 and down through 5. The terminals 42 43 of the coils C, which were left exposed when the coils were wound, are now to be properly connected up. The terminals 42 of coils 1 and 3, counting from the left in the diagrams, and terminals 43 of coils 2 and 4 are connected together by the conductor 44. Similarly, the terminals 43 of coils 1 and 3 and terminals 42 of coils 2 and 4 are connected together by the conductor 45. By means of the wire 50 the conductor 44 is connected with the lead 46, running from one of the main supply-wires 48. The conductor 45 is connected directly to the lead 47, running from the other supply-wire 49. These supply-wires are fed from a suitable source of single-phase current, which I have not considered it necessary to illustrate. The terminals of every other coil are reversely connected for the obvious purpose of producing different polar effects. I have also interposed in the connecting-wire 50 an inductive resistance comprising a coil $50^a$, wound about a magnetic core $50^b$, for a purpose which will hereinafter appear.

It is of course clear that any or all of these coils C might be wound upon a suitable form, so as to constitute a separate and distinct winding, such as is shown in Fig. 5, which could be subsequently put in place upon the core.

When the auxiliary coils have been placed in the manner above described, the main coil is woven into place in a similar manner. This winding may be a lap winding, as illustrated in Fig. 3, or a concentric winding, as illustrated in Fig. 4. The coil B, which I have illustrated in Figs. 1 and 2, is used in forming the lap winding, (illustrated in Fig. 3,) and a coil B', similar in all respects to the coil B, except that it is longer, which is necessary because of its different disposition upon the core, is used in forming the concentric winding illustrated in Fig. 4. Both of these coils are woven upon the core in a manner similar to the winding of the auxiliary coils, but by reason of their greater length they pass through more of the slots of the core.

Upon reference to the winding of the coil B, which is illustrated in Fig. 3, it will be seen that said coil is passed down through slot 1, up through 5, down through 2, up through 6, down through 3, up through 7, down through 4, forming one polar winding, and then over to and up through slot 8, down through 11, up through 9, and so on until the entire coil is woven into place, so as to form the four polar windings, as diagrammatically shown. When the entire coil is in place except that portion which passes through the last slot, it will be found that the coil is of just sufficient length to be pressed or drawn into its slot without leaving any appreciable slack or surplus. The exposed terminals 51 and 52 of the coil B are then connected to the leads 46 and 47, respectively.

Upon reference to the winding of the coil B' in accordance with the diagram illustrated in Fig. 4 it will be found that the coil is passed up through the slot 6, down through 7, up through 5, down through 8, up through 4, and down through 9, forming one polar winding in a manner similar to that heretofore described in connection with the winding of the auxiliary coils, and then over to and up through slot 13, down through 12, and so on until the entire coil is woven into place to form the four polar windings. As in previous cases the coil is of just sufficient length to fill all of the slots in accordance with the predetermined arrangement of winding and without leaving any objectionable slack. The terminals $51^a$ and $52^a$ of this coil B' are connected to the leads 46 and 47, respectively. Thus in case of either of the long coils B or B' the long coil is the practical equivalent of the number of short coils connected in series. A portion of these short coils may be traced in the case of the long coil B, as follows: One short coil passes up through 5 and down through 2, a second up through 6 and down through 3, and a third up through 7 and down through 4. Similarly tracing a portion of the coil B', one short coil passes up through 6 and down through 7, a second up through 5 and down through 8, and a third up through 4 and down though 9. By tracing out all the short coils for either long coil B or B' in the above manner it will be found that both long coils are made up of a number of short coils connected in series.

Considering the current-flow through the main windings, assuming a certain instantaneous direction of flow, the current will pass from one supply-wire, as 48, through the lead 46, there dividing, part passing into the wire 50, which leads to the auxiliary coils, and part to the terminal 51 in the case of the coil B or 51$^a$ in case of the coil B', thence throughout that portion of the wire constituting one turn of the coil, then through another turn, and so on until the complete wire forming the coil has been traversed, thence by the terminals 52 or 52$^a$, as the case may be, to the lead 47 and supply-wire 49. Similarly, that portion of the current which passes into the wire 50 passes through the coil 50$^a$, conductor 44, through the auxiliary coils C C in parallel to the conductor 45, thence to the lead 47, where it combines with the other portion and passes to the supply-wire 49.

From the above course of the current it is evident that the long coil will produce the same results as a number of short coils arranged in the manner previously given and connected in series, although it differs slightly therefrom in that the path in the long coil extends through one turn of each short coil before it enters the second turn, whereas in the case of short coils connected in series the path extends through all turns of one coil before entering the second coil. However, for the purposes of this invention the one is the electrical equivalent of the other, and no distinction will be made elsewhere in the specification or claims between them. According to this assumption of instantaneous direction of current-flow in case of the auxiliary coils, centers of north poles (designated N') are produced between the slots 2 3 and slots 14 15 and the centers of south poles (designated S') between the slots 8 9 and 20 21. Similarly, polar centers for the main winding formed by the coil B are found between the slots 4 5, 10 11, 16 17, 22 23 and are designated N or S, according as they are north or south, and for the winding made from the coil B', similarly designated, polar centers are formed between the slots 6 7, 12 13, 18 19, 24 1.

From the above it will be seen that the centers of polar areas produced by the auxiliary coils are displaced relative to corresponding centers of polar areas produced by the main winding, and it will also be noted that current passing through the auxiliary coils passes through the inductive resistance in the wire 50, previously referred to, and is thereby put out of phase with the current in the main winding, and consequently the effective polar areas caused by the auxiliary windings occur at different times than the corresponding effects produced by the main winding. This produces the necessary drag on the armature to make the machine self-starting. The auxiliary coils C C, which are in series with the inductive resistance, are connected in multiple rather than in series with each other for the purpose of increasing the dephasing effect of said inductive resistance. The separate coils might, however, be connected in series, or they might be formed in a single coil the same as the main motor-winding if such a construction should be deemed desirable; also, the main winding might be wound in separate coils the same as the starting-winding. The arrangement shown in the drawings is, however, the preferred arrangement for small motors.

I do not wish my invention to be restricted to the particular type of machine disclosed or to the particular windings or connections therein specified. Many changes may be made without departing from the spirit of my invention. It is also clear that the main winding, as well as the auxiliary windings, may be made upon suitable forms and subsequently put in place on the core instead of being woven directly thereupon.

Although I have referred to field-windings throughout this disclosure of my invention, yet my invention is equally applicable to armature-windings.

What I claim as new, and desire to secure by Letters Patent of the United States, is—

1. The method of winding a dynamo-electric machine having a toothed or slotted structure for the reception of windings, which consists in forming a winding of one or more long coils and weaving each long coil in and out of the notches of said toothed or slotted structure in such a manner as to make a plurality of short coils connected in such series.

2. The method of forming a winding for a dynamo-electric machine, which consists in making a long coil and then disposing the parts thereof so as to form a plurality of short coils connected in series.

In witness whereof I have hereunto set my hand this 19th day of March, 1903.

JOHN B. WIARD.

Witnesses:
DUGALD McK. McKILLOP,
JOHN J. WALKER.